FIP8102 XR 3,060,269

CROSS REFERENCE

SEARCH ROOM

Tx 5220E

Oct. 23, 1962 B. R. STACK 3,060,269

CARRIER SIGNALLING SYSTEM

Filed Oct. 14, 1959 2 Sheets-Sheet 1

INVENTOR.
BOGDAN R. STACK
BY Charles Baraff
AGENT

3060269
OR IN 179/15BY

Oct. 23, 1962 B. R. STACK 3,060,269

CARRIER SIGNALLING SYSTEM

Filed Oct. 14, 1959 2 Sheets-Sheet 2

| TRANSISTORS | 42 | 43 | 44 |
|---|---|---|---|
| NO INPUT | SHORT | OPEN | SHORT |
| LO TONE | SHORT | SHORT | OPEN |
| HI TONE | OPEN | SHORT | SHORT |

INVENTOR.
BOGDAN R. STACK
BY Charles Baraff
AGENT

United States Patent Office 3,060,269

Patented Oct. 23, 1962

3,060,269

CARRIER SIGNALLING SYSTEM

Bogdan Roman Stack, Los Altos, Calif., assignor to International Telephone and Telegraph Corporation, Nutley, N.J., a corporation of Maryland Filed Oct. 14, 1959, Ser. No. 846,504
16 Claims. (Cl. 179—15)

This invention relates to signalling over telephone lines and more particularly to exchange carrier signalling.

A new phase in carrier system development occurred with the introduction of carrier circuits to short-haul toll circuits as well as to tributary, trunk, and long exchange lines. New economies is design and manufacture produced the well-known, short haul N, O and ON carrier systems which made the application of carrier to circuits between 20 to 200 miles long economically feasible. Thereafter, the attention of telephone engineers turned to an area of the telephone transmission plant which had heretofore defied the economic application of carrier techniques on any significant scale namely, the trunk and exchange circuits where more than 50% of the circuits fall in the 5 to 20 mile range. If a carrier system could be provided to serve this class of circuits, still another order of magnitude of carrier application to telephone transmission could be achieved, with its attendant gain in service to the subscriber.

One of the most important aspects in the development of a new telephone transmission system is to make it compatible with the previous existing telephone plant. In the case of exchange and trunk facility, one is dealing with an essentially low-frequency medium. For voice transmission, the lines are equalized for response in the 0 to 4 kc. frequency range by the addition of loading coils and repeaters of the hybrid or negative impedance type. In addition to voice, the physical line is, of course, capable of transmitting D.C. signalling pulses and all other possible states of the loop battery, that is, battery on and off, normal or reverse. If a carrier system were economically to replace this service, it would have to be capable of using the facility to an order of half-a-megacycle bandwidth, accommodate a relatively complicated signalling requirement, provide a very high degree of quality and be simple to install and maintain.

An exchange carrier system must provide a choice of signalling facilities not previously provided as an integral part of carrier systems. Two types of signalling are of principal interest, loop signalling and revertive signalling. In their simplest terms, these two types require the transmission of the following information:

Loop signalling requires the transmission of closed-, open-loop conditions from an originating to a terminating office at a rate of 0 to 14 alternations per second. In the reverse direction, the transmission is that of the condition of the battery, normal or reverse, at a somewhat slower rate.

Signalling states which normally appear in the terminating office and are transmitted to the originating office are as follows:

(A) Negative battery, particularly on the tip wire, ring wire being grounded;
(B) Negative battery particularly on the ring wire, tip wire being grounded;
(C) Both tip and ring wires grounded (no battery).

Accordingly, an object of the invention is to provide revertive pulse signalling over a carrier transmission system.

A further object of the invention is revertive pulse signalling for exchange carrier systems wherein three amplitude levels of a single frequency tone are utilized to identify the signalling states aforementioned.

Another object of the invention is the transmission and reception at telephone exchanges of a carrier modulated by a signalling tone having three amplitude levels to identify signalling states.

A feature of the invention is a tone oscillator which is keyed electronically to provide respectively low level tone, high level tone and no tone as the signalling indications.

Another feature of the invention is a signal tone receiver for exchange carrier systems having switching transistors controlled by three levels of an incoming signalling tone.

The above-mentioned and other features and objects of this invention will become more apparent by reference to the following description taken in conjunction with the accompanying drawings, in which.

Figure 1:
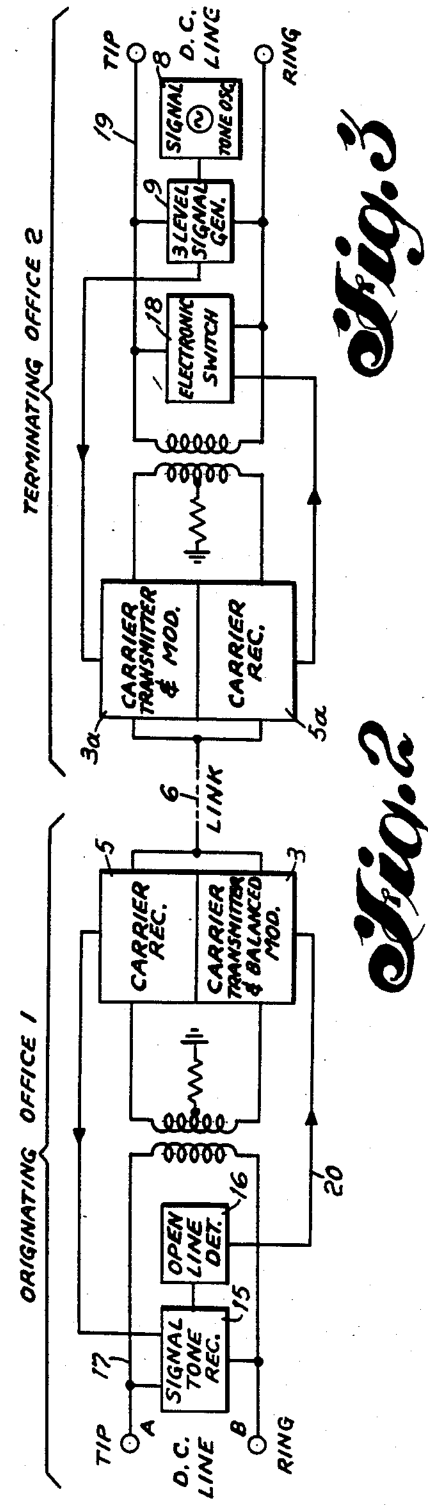
FIG. 1 is a block schematic of a signalling circuit for an exchange carrier system.

Referring now to FIG. 1, a two-way exchange carrier communication system is illustrated connecting an originating office 1 with a terminating office 2 over a transmission medium 6.

At the originating office 1, a carrier transmitter 3 generates carrier frequencies modulated by voice or telegraph signals, the modulated carrier frequencies pass over the transmission medium 6 and are received at the terminating office 2 by means of a carrier receiver 5*a*. The carrier communication system may be of the frequency frogging type illustrated by U.S. Patent No. 2,695,332, issued November 23, 1954, to R. S. Caruthers, or U.S. Patent 2,695,927, issued November 30, 1954, to R. S. Caruthers et al. It should be understood that other forms of carrier systems may be employed with the signalling system disclosed herein.

The transmission medium 6 may be wire or cable as is customary for telephone or telegraph carrier transmission, or radio circuits may be used in a well-known manner.

Figure 2:
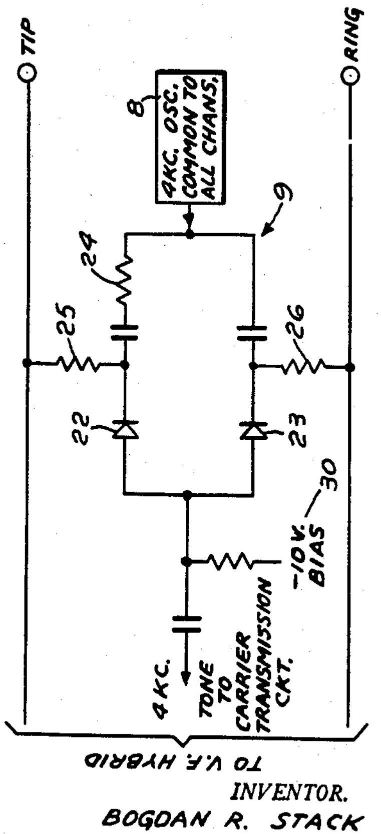
FIG. 2 is the transmitter for generating a three level signalling tone in the exchange carrier system illustrated in FIG. 1.

Referring to FIG. 2, the signalling transmitter and modulator 3*a* is shown for the terminating office 2 for generating three amplitude levels from a well-known 4 kc. oscillator 8 common to all carrier channels and providing a signalling tone transmitted from the terminating office 2 to the originating office 1. The three levels are generated by means of a resistance diode network 9 connected to the 4 kc. oscillator in the following manner. When the tip wire is at —48 volts and the ring wire at ground potential, diode 22 is conducting and diode 23 is cut off. The 4 kc. signalling tone from the oscillator 8 is attenuated by resistor 24, resulting in the "low level tone," that is, representing the first signalling condition. When the tip wire is at ground and the ring at —48 volts, the diode 22 is cut-off while the diode 23 is conducting. Under these circumstances, there is no resistance in the path of the 4 kc. signalling tone thereby resulting in the "high level tone" which provides the second aforementioned signalling condition. The resistors 25, 26 are of high ohmic value and consequently do not load the circuit.

When both the tip and ring wire are grounded, no signalling tone is transmitted thereby providing a third signalling condition. The diodes 22, 23 are cut-off by the negative bias source 30 when both grounds are present.

The three signalling levels of the tone are transmitted to the carrier receiver 5 at originating orifice 1.

The three conditions of signalling and the corresponding amplitudes of the signalling tone are represented in tabular form:

| | | |
|---|---|---|
| Condition A | tip negative | low level tone. |
| Condition B | ring negative | high level tone. |
| Condition C | short | no tone. |

Figure 3:
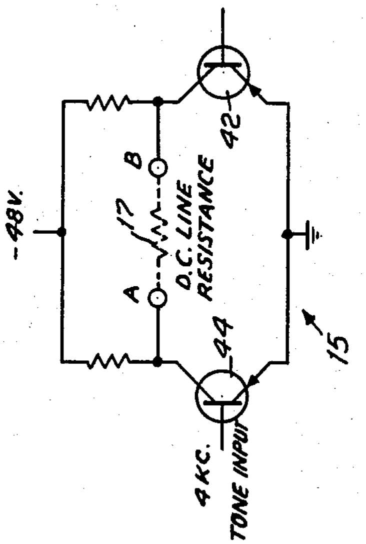
FIG. 3 is an explanatory diagram illustrating the principle of transistor operation in the signal tone receiving circuit.
Figures 4, 4A:
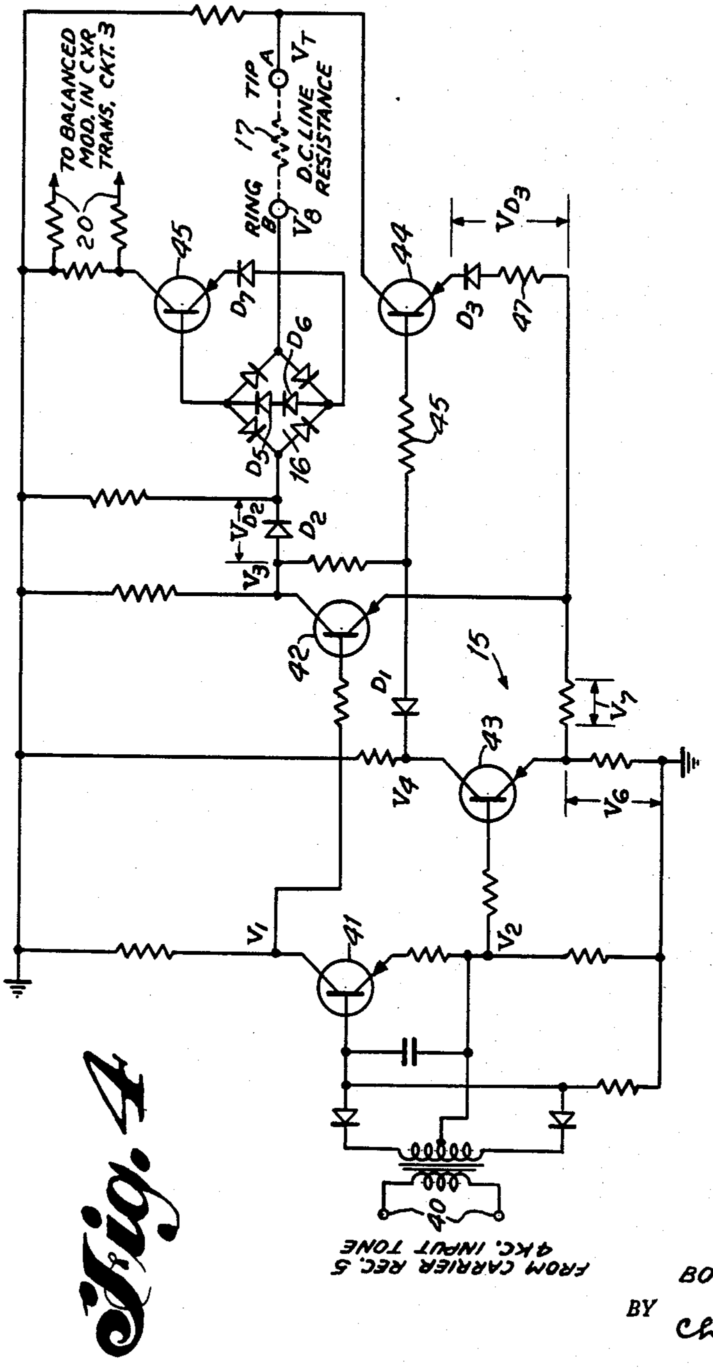
FIG. 4 is the signalling tone receiver for the exchange carrier system.
FIG. 4A is a table showing the operating conditions of transistors in the signal receiver.

Referring to FIG. 3, this shows a simplified receiving circuit primarily explaining the principle of operation of the signal tone receiver 15 of FIG. 4. Transistor switches 44 and 42 are controlled indirectly by the level of the incoming 4 kc. tone signal. The reversal of polarity of current in the D.C. line and current keying are accomplished as follows: when transistor 44 is open, point A is at a high potential at the same time that transistor 42 is shorted and point B is at ground potential. Current flows in the line 17 from A to B.

When transistor 44 is shorted and transistor 42 is open, point A is at ground and point B is at high potential under these conditions. Current now flows in the D.C. line in the opposite direction (from B to A).

When both transistors 44 and 42 are shorted, points A and B are at ground potential and no current flows in the line 17. Accordingly, it should be apparent that the operation of the signalling tone receiver 15 described in greater detail below corresponds respectively to the three signalling conditions (A), (B), (C), aforementioned.

FIG. 4 shows the transistorized signal tone receiver 15 and open line detector 16 of FIG. 1. The function of the signalling tone receiver 15 is to reproduce the various conditions, A, B, C, appearing at the terminating office 2, which are represented as the three levels of the signalling tone aforementioned.

*Condition I—No Signal Tone*

When no input signalling tone is present at the receiver terminals 40 (FIG. 4) no collector or emitter current is present in transistor 41. Since the voltage at point $V_2$ is not sufficient to operate transistor 43, which is cut off by the bias voltage $V_6$, therefore, transistor 43 does not conduct. The voltage at $V_4$ is high and diode $D_1$ is biased in the forward direction i.e. in the low resistance direction. The transistor 44 is saturated due to base current flowing through resistor 45 and diode $D_1$. The circuit constants are such that transistor 44 is saturated even when voltage at point $V_3$ equals 0.

The tip wire voltage $V_T$ is then equal to:

$$V_T = V_{D3} + V_7 + V_6$$

The voltage $V_1$ is higher than $V_7 + V_6$ and therefore transistor 42 saturates. The voltage $V_3 = V_7 + V_6$ and diode $D_2$ is now biased in the forward direction.

Thus, the ring wire voltage $V_8 = V_6 + V_7 + V_{D2}$ i.e. by neglecting the voltage drop across diode bridge 16 which represents the open line detector. Comparing this to the tip voltage, it is obvious no current flows in the line if $V_{D2} = V_{D3}$. If both diodes $D_1$ and $D_2$ are identical, this is true. However, as described later, $V_{D3}$ is intentionally made higher than $V_{D2}$ by the addition of small resistor 47 in order to have a small current flowing in the line even with no input signal condition present.

*Condition II—Low Input Tone Signal (Standby Condition or Keying)*

When a low level tone signal appears at terminal 40 of the receiver (FIG. 4) a low collector current is developed in transistor 41. The voltage at $V_2$ is sufficiently high to saturate transistor 43 and point $V_4$ is practically at ground potential or rather equal to voltage $V_6$. The diode $D_1$ is cut-off.

The voltage at point $V_1$ is lowered but not enough to cut off transistor 42, which is still saturated. The voltage at point $V_3$ is very low and equal to $V_7 + V_6$. The diode $D_2$ is conducting. Accordingly, the voltage $V_8$ at the ring wire $= V_3 + V_{D2}$. Since diode $D_1$ is cut-off, the transistor 44 is cut-off by voltage $V_{D3}$. The net line current is from Tip to Ring and given by $$\frac{V_T - V_8}{\text{Line Resistance}}$$

*Condition III—High Level Tone Signal—(Battery Reverse Condition)*

When a high level tone signal appears at terminal 40, the collector current in transistor 41 is high and transistor 43 saturates. The voltage at $V_4$ is very low ($=V_6$) and the diode $D_1$ is cut off. The voltage at point $V_1$ is lowered sufficiently so that transistor 42 is cut-off, i.e., the voltage $V_1$ being lower than $V_7 + V_6$. When transistor 42 is cut-off, the voltage at point $V_3$ is high and diode $D_2$ is cut-off. The voltage at the base of transistor 44 is high, so that transistor 44 becomes saturated. The voltage at the tip conductor thereby goes very low, becoming $$V_T = V_{D3} + V_7 + V_6$$

The voltage at point $V_8$ of the Ring Conductor is high but lower than $V_3$, thus keeping diode $D_2$ cut-off. Accordingly, the net line current is from Ring to Tip or the reverse of Case II above.

*Condition IV—Line Interruption at Originating Office*

The originating office 1 can open and close the D.C. line to signal the terminating office 2 that enough pulses were counted. Since such open circuit occurs during the "no input condition" above, there is theoretically no current in the D.C. line 17 (FIG. 1). A priori, it would be therefore impossible to detect such open circuit. To correct this situation, a certain amount of current is introduced into the line even in the "no input tone" condition by increasing the voltage $V_{D3}$. This is achieved by the small resistor 47 in series with the diode $D_3$.

The interruption of this line current is detected by means of the diode bridge 16 and transistor 45. Since this entire current is in series with the line 17, no current flows into the base of transistor 45 when the line is opened and consequently the collector current is reduced to a very low value.

This D.C. current emanating from the open line detector 16 and transistor 45 flows in path 20 to control the carrier leak of a balanced modulator in the carrier transmitting circuit 3 (FIG. 1). If D.C. current is present (line closed), the modulator is unbalanced by it, and a controlled amount of carrier leak is obtained. When current is absent (line open), the modulator is again balanced and no carrier leak is present.

Thus, opening and closing of the D.C. line 17 results in On-Off pulses of carrier frequency. These pulses are detected at the far end or terminating office 2 and operate an electronic switch 18, which may be a diode bridge switch or the like. The electronic switch 18 at the terminating office 2 keeps the terminating D.C. line 19 shorted as long as it receives the carrier tone from the originating office 1.

In this manner, when the D.C. line 17 at the originating office (FIG. 1) is opened, which results in the interruption of outgoing carrier tone from carrier transmitter 3, the electronic switch 18 at the terminating office 2 will open the terminating D.C. line 19 thus instantaneously reproducing the far end condition.

The amount of current in the base of transistor 45, which provides the D.C. carrier leak control in path 20, is determined by the forward voltage drop of diodes $D_5$ and $D_6$ in the diagonal path of diode bridge 16 (FIG. 4). Voltage across the diode $D_7$ provides emitter bias for transistor 45. The diode bridge 16 is required since current direction in the line is not predictable. It is possible to use a Zener diode for diode $D_6$ shown and operate it in its breakdown condition to achieve better voltage control.

FIG. 4A is a summarized tabulation of the condition of transistors 42, 43 and 44 of the signal tone receiver 15, when the three level conditions aforementioned are existent at terminal 40.

It should be understood that while the system described relates to revertive pulse signalling, it can also be applied to loop signalling. It should also be apparent that the system of signalling disclosed heretofore permits an accurate and instantaneous reproduction of all signalling functions, usually performed by means of D.C. current only. The instantaneous detection of an open-loop condition during the "no tone" period and the instantaneous reproduction of this condition at the opposite terminal are especially noteworthy in this connection.

It should be apparent that the signalling circuit disclosed can operate simultaneously in the two directions of transmission independently of each other, and being electronic in nature is virtually instantaneous. Also, when there is an equipment or carrier line failure, it results in no current in the D.C. line of the originating office. Accordingly, this line cannot be seized again until the trouble is corrected i.e. line seizure is prevented until the circuit is restored.

While I have described above the principles of my invention in connection with specific apparatus, it is to be clearly understood that this description is made only by way of example and not as a limitation to the scope of my invention as set forth in the objects thereof and in the accompanying claims.

I claim:

1. A carrier signalling system for an exchange carrier system comprising terminals for an originating office and a terminating office, carrier transmitters, modulators and receivers in each of said offices, a communication link coupled between said offices, a single frequency oscillator at the terminating office, and means including a network coupled to said oscillator for deriving from said oscillator a single signalling tone with three discrete amplitude levels for transmission over said link to said originating office.

2. The system of claim 1, wherein the originating and terminating office each have a direct current line, and a signalling tone receiver for said three levels having an open direct current line detector circuit therein.

3. The system of claim 2, and a signalling tone receiver having transistors responsive to a high and low level of the signal tone respectively.

4. The system of claim 2, and said signalling tone receiver having transistors adapted to be shorted for controlling the presence or absence of current in the direct current line of one of the terminals.

5. The system of claim 1, and a signalling tone receiver having means for detecting an open circuit condition in the direct current line of the originating office.

6. The system of claim 1, and a signalling tone receiver having means for detecting two of said transmitted three levels of the signalling tone.

7. The system of claim 1, and a signalling tone receiver having means for interrupting a carrier leak control current in response to an open direct current line condition at the terminating office.

8. A two-way exchange carrier system comprising first and second carrier terminals, an oscillator and diode network coupled thereto at the first terminal for generating and transmitting a single frequency tone having three levels simulating revertive pulse signalling states and means at the second carrier terminal for selectively receiving the three signal levels comprising a plurality of switching transistors responsive to high and low levels of a single frequency tone, and to the absence of transmitted signalling current.

9. A carrier signalling system for an exchange trunk carrier system comprising an originating and termination office having a direct current line and carrier terminals for two-way transmission, said terminals having carrier transmitters, balanced modulators and carrier receivers, a communication link connecting said offices, an oscillator having diodes coupled thereto for transmitting a single tone having three amplitude levels representing high tone, low tone and absence of tone, and a signal tone receiver having means responsive to said amplitude levels.

10. The system of claim 9, and said receiver having a detector for detecting the absence of direct current in the direct current line of the originating office.

11. The system of claim 9, wherein said receiver comprises transistors for controlling the presence or absence of current in the corresponding direct current line and the direction of direct current flow therein.

12. The system of claim 9, and means in said receiver for unbalancing said modulator and transmitting a direct current leak in a direct current line.

13. The system of claim 9, wherein said receiver comprises switching transistors connected to a direct current line and responsive to said amplitude levels, one of said transistors having means connected thereto for providing a direct current for unbalancing said modulator in the originating office.

14. The carrier signalling system of claim 1, wherein said network comprises diodes connected in parallel paths, one path containing a resistor coupled to one diode, and a tone receiver having means for interrupting a carrier frequency leak current in response to an open direct current line condition at the originating office and instantaneously reproducing this open line condition at the terminating office.

15. The carrier signalling system of claim 1, and a signal tone receiver having a plurality of switching transistors for detecting the three levels of the received signalling tone.

16. The carrier signalling system of claim 1, and a receiver comprising a transistor responsive to said transmitted signals, and a pair of parallel connected switching transistors responsive to discrete amplitude levels of the signalling tone respectively.

References Cited in the file of this patent

UNITED STATES PATENTS

| | | |
|---|---|---|
| 1,522,580 | Espenshied | Jan. 13, 1925 |
| 2,008,563 | Sarbey | July 16, 1935 |
| 2,616,960 | Delletel | Nov. 4, 1952 |
| 2,740,890 | Golladay | Apr. 3, 1956 |
| 2,816,238 | Elliott | Dec. 10, 1957 |
| 2,927,966 | Weller | Mar. 8, 1960 |
| 2,951,980 | Jones et al. | Sept. 6, 1960 |
| 2,992,338 | Winters | July 11, 1961 |